US012652229B2

(12) United States Patent
Burks et al.

(10) Patent No.: US 12,652,229 B2
(45) Date of Patent: Jun. 9, 2026

(54) LOAD BALANCING BETWEEN MULTIPLE TRAFFIC FLOWS USING A PARAMETER

(71) Applicant: T-Mobile Innovations LLC, Overland Park, KS (US)

(72) Inventors: Sherry Burks, Olathe, KS (US); Johnny J. Castaneda, Graham, WA (US); Kairy R. Ibrahim, Olathe, KS (US); Boris Maisuradze, Sammamish, WA (US); Robert K. Moore, Newcastle, WA (US); Trevor L. Peterson, Maple Valley, WA (US); Ranjith Sekar, Bellevue, WA (US); Joshua S. Sterner, Redmond, WA (US); Keith Wood, Cle Elum, WA (US)

(73) Assignee: T-Mobile Innovations LLC

( * ) Notice: Subject to any disclaimer, the term of this patent is extended or adjusted under 35 U.S.C. 154(b) by 217 days.

(21) Appl. No.: 18/403,562

(22) Filed: Jan. 3, 2024

(65) Prior Publication Data

US 2025/0219927 A1     Jul. 3, 2025

(51) Int. Cl.
  *H04L 43/50*       (2022.01)
  *H04L 43/062*      (2022.01)
  *H04L 47/125*      (2022.01)
(52) U.S. Cl.
  CPC ............ *H04L 43/50* (2013.01); *H04L 43/062* (2013.01); *H04L 47/125* (2013.01)
(58) Field of Classification Search
  CPC ..... H04L 43/50; H04L 43/062; H04L 47/125; H04L 45/306; H04L 67/1001; H04L 41/0663; H04L 43/026
  See application file for complete search history.

(56) References Cited

U.S. PATENT DOCUMENTS

| | | | | |
|---|---|---|---|---|
| 2013/0185408 A1* | 7/2013 | Ngo | ...................... | G06F 9/5077 |
| | | | | 709/223 |
| 2013/0227058 A1* | 8/2013 | Drysdale | ................. | H04W 4/60 |
| | | | | 709/217 |

(Continued)

FOREIGN PATENT DOCUMENTS

| | | | | |
|---|---|---|---|---|
| EP | 1049307 A1 * | 11/2000 | ............... | H04L 9/40 |
| EP | 4030736 A1 | 7/2022 | | |
| EP | 4583484 A1 | 7/2025 | | |

OTHER PUBLICATIONS

Foreign Communication From a Related Counterpart Application, Partial EP Search Report and EP Search Opinion dated May 19, 2025 EP Application No. 24223179.3.

*Primary Examiner* — Philip C Lee

(57)          ABSTRACT

A method comprises receiving, by a first virtual service (VS) application in a load balancer of the communication system, client packets from a client, receiving, by a second VS application in the load balancer, test packets from a tester obtaining, by the first VS application and the second VS application, a parameter from a data store communicatively coupled to the load balancer, determining, by the first VS application, a selected pool in the load balancer toward which to forward the client packets based on a first rule programmed at the first VS application and the parameter, and determining, by the second VS application, a test pool in the load balancer toward which to forward the test packets based on a second rule programmed at the second VS application and the parameter.

20 Claims, 9 Drawing Sheets

(56)  References Cited

U.S. PATENT DOCUMENTS

| | | |
|---|---|---|
| 2019/0238633 A1 | 8/2019 | Rao et al. |
| 2022/0030060 A1 | 1/2022 | Jain et al. |
| 2023/0224361 A1 | 7/2023 | Karuppannan et al. |

* cited by examiner

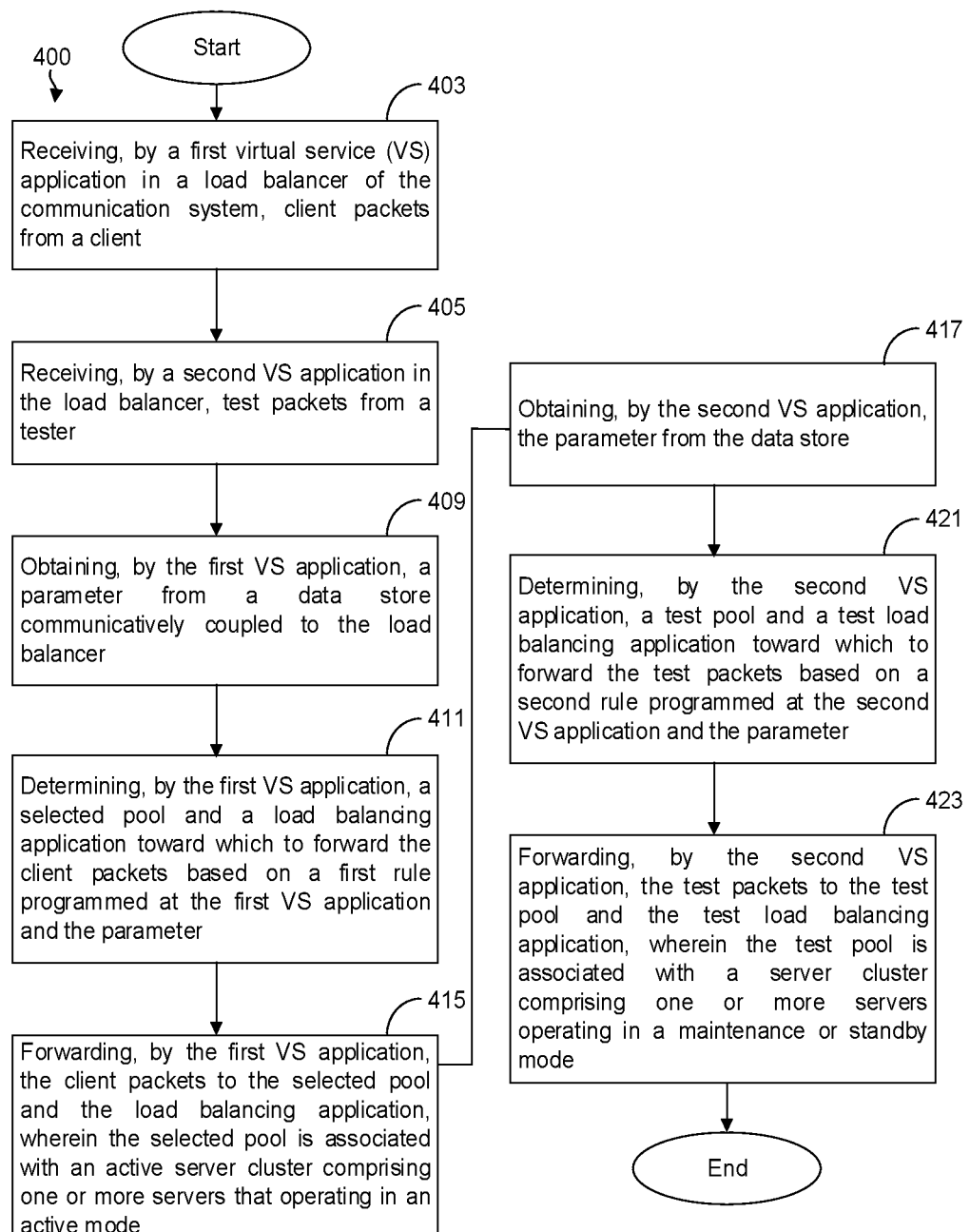

400

Start

403

Receiving, by a first virtual service (VS) application in a load balancer of the communication system, client packets from a client

405

Receiving, by a second VS application in the load balancer, test packets from a tester

409

Obtaining, by the first VS application, a parameter from a data store communicatively coupled to the load balancer

411

Determining, by the first VS application, a selected pool and a load balancing application toward which to forward the client packets based on a first rule programmed at the first VS application and the parameter

415

Forwarding, by the first VS application, the client packets to the selected pool and the load balancing application, wherein the selected pool is associated with an active server cluster comprising one or more servers that operating in an active mode

417

Obtaining, by the second VS application, the parameter from the data store

421

Determining, by the second VS application, a test pool and a test load balancing application toward which to forward the test packets based on a second rule programmed at the second VS application and the parameter

423

Forwarding, by the second VS application, the test packets to the test pool and the test load balancing application, wherein the test pool is associated with a server cluster comprising one or more servers operating in a maintenance or standby mode End

LOAD BALANCING BETWEEN MULTIPLE TRAFFIC FLOWS USING A PARAMETER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Load balancing is the process of distributing network traffic across multiple servers. This ensures no single server bears too much traffic load. By distributing the work across multiple servers, load balancing improves application responsiveness, while increasing availability of applications and websites for users. A load balancer intercepts traffic for a destination user, device, application or website, and reroutes the traffic to one or more servers based on a selected load balancing algorithm. Load balancing algorithms may be used to perform the load balancer functions, and the algorithms may prioritize specific requests from specific clients while distributing traffic to ensure consistent, high-performance application delivery, and providing scalability, reliability, and high availability.

SUMMARY

In an embodiment, a method implemented in a communication system to perform load balancing across multiple traffic flows is disclosed. The method comprises receiving, by a first virtual service (VS) application in a load balancer of the communication system, client packets from a client, and receiving, by a second VS application in the load balancer, test packets from a tester. The method further comprises obtaining, by the first VS application, a parameter from a data store communicatively coupled to the load balancer, determining, by the first VS application, a selected pool and a load balancing application toward which to forward the client packets based on a first rule programmed at the first VS application and the parameter, and forwarding, by the first VS application, the client packets to the selected pool and the load balancing application, wherein the selected pool is associated with an active server cluster comprising one or more servers operating in an active mode. The method further comprises obtaining, by the second VS application, the parameter from the data store, determining, by the second VS application, a test pool and a test load balancing application toward which to forward the test packets based on a second rule programmed at the second VS application and the parameter, and forwarding, by the second VS application, the test packets to the test pool and the test load balancing application, wherein the test pool is associated with a server cluster comprising one or more servers operating in a maintenance or standby mode.

In another embodiment, a method implemented in a communication system to perform load balancing across multiple traffic flows is disclosed. The method comprises receiving, by a virtual service (VS) application in a load balancer in the communication system, a first set of packets from a first source, determining, by the VS application, a type of the first source based on data carried in the first set of packets, obtaining, by the VS application, a parameter from a data store communicatively coupled to the load balancer at a first time, and determining, by the VS application, to route the second set of packets to a second pool and a second load balancing application in the load balancer based on inputting the parameter and the type of the second source to the rule, wherein the second load balancing application is associated with a switch server cluster that comprises one or more servers and is different from the default server cluster. The method further comprises, receiving, by the VS application, a second set of packets from a second source, determining, by the VS application, a type of the second source based on data carried in the second set of packets, and obtaining, by the VS application, the parameter from the data store at a second time after the first time. The method further comprises determining, by the VS application, to route the second set of packets to a second pool and a second load balancing application in the load balancer based on inputting the parameter and the type of the second source to the rule, wherein the second load balancing application is associated with a switch server cluster that comprises one or more servers and is different from the default server cluster.

In yet another embodiment, a communication system is disclosed. The communication system comprises at least one data store configured to store a parameter, at least one processor, at least one memory coupled to the processor, a virtual service (VS) application, a first load balancing application, and a second load balancing application. The VS application is stored in the at least one memory, which when executed by the at least one processor, causes the at least one processor to be configured to determine to route a first packet to a first server cluster at a first time in response to applying the parameter to a rule programmed at the VS application, wherein the first server cluster is associated with a first pool comprising a first load balancing application, and transmit the first packet to the first pool. The first load balancing application is stored in the at least one memory, which when executed by the at least one processor, causes the at least one processor to be configured to determine a server in the first server cluster to which the route the first packet at the first time based on a one or more load balancing factors. At a second time after the first time, the parameter changes in value, and wherein after the second time, the VS application, when executed, further causes the at least one processor to be configured to determine to route a second packet to a second server cluster at a second time in response to applying the parameter to the rule, wherein the second server cluster is associated with a second pool comprising a second load balancing application, and transmit the second packet to the second pool. The second load balancing application is stored in the at least one memory, which when executed by the at least one processor, causes the at least one processor to be configured to determine a server in the second server cluster to which the route the second packet based on the one or more load balancing factors.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 4 is a flowchart of a first method of load balancing between multiple traffic flows according to various embodiments of the disclosure.

DETAILED DESCRIPTION

Figure 1:
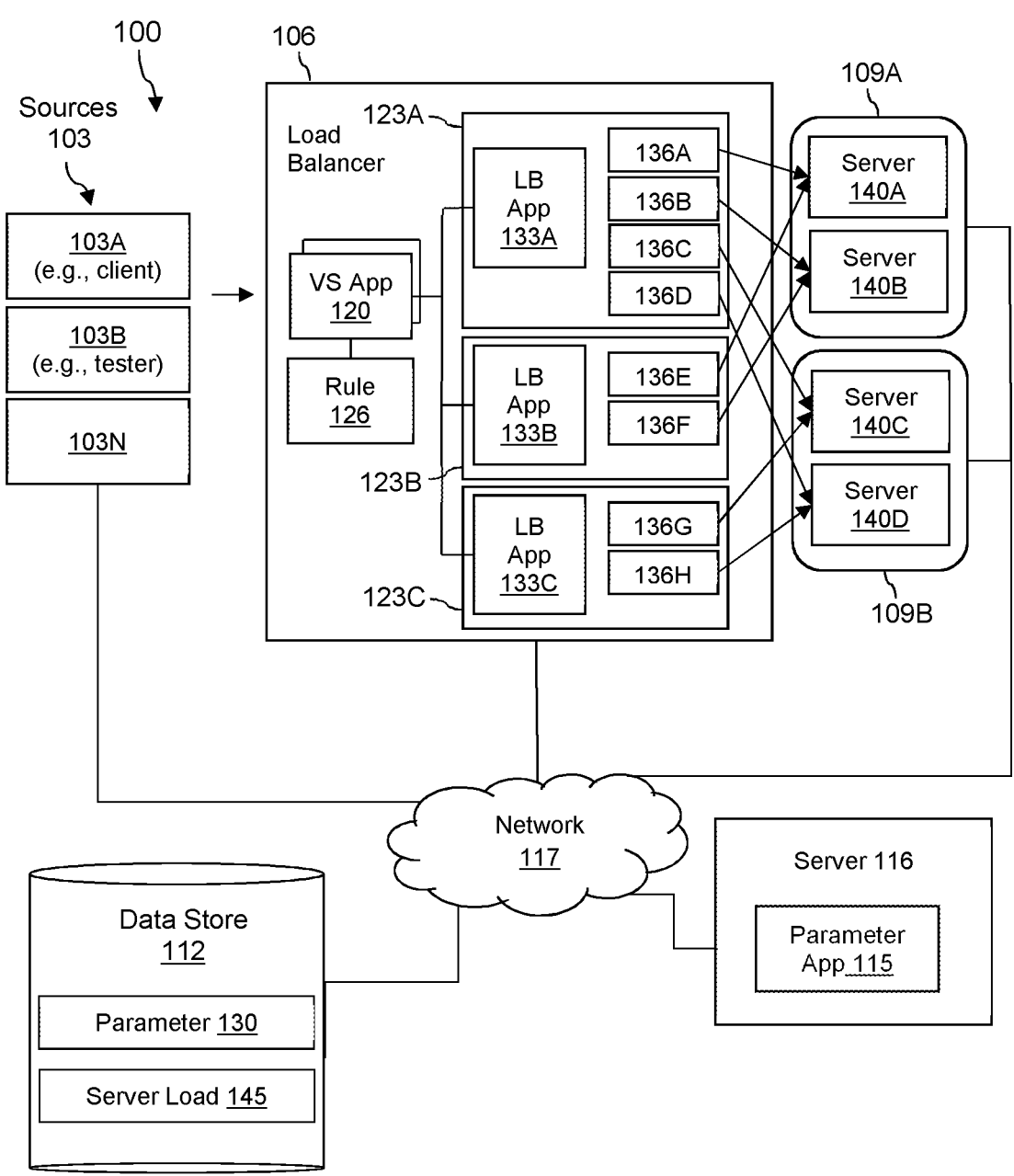
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A load balancer may distribute data communication packets from a source to one or more servers based on a destination address and other factors. The load balancer may be responsible for not only balancing the load across the servers, but also providing high availability, by routing the packets to other servers if one or more of the servers is not available. To this end, a load balancer may include various components, such as a virtual service (VS) application at the front-end, which may receive the packets from the sources. The load balancers may also include one or more pools, which may be objects that logically indicate one or more servers in the system. For example, a pool may include one or more load balancing applications and one or more member nodes. The member nodes may correspond to identifiers or addresses of the servers in the system, and the load balancing application may be responsible for managing how the load is balanced between the servers based on the member nodes, for example, based on different load balancing algorithms and load balancing factors. In this way, a pool may be a pre-defined logical grouping of one or more servers, in which the servers in the pool may be physically grouped together in a single computing system, server, data center, or other physical location, or the servers may be in geographically disparate locations. As an example, a first pool may include member nodes for four servers (i.e., the first pool containing these four servers). A load balancing application of this first pool may be responsible for receiving packets from the VS application, and then forwarding the packets to a particular server attached to the pool based on, for example, a load across all of the servers attached to the pool, in an attempt to distribute packets equally. The forwarding of the packets to a particular server attached to the pool may also be based on other load balancing factors that are considered across a variety of different load balancing algorithms, and the factors considered in the load balancing is not limited herein. For example, the other load balancing factors may include server health, geographic location, server persistence, content-based routing, server capacity, server resources, associated costs, security considerations, quality of service requirements, server priorities, etc.

Meanwhile, the servers themselves may be external to the load balancer and accessible over a network, and the servers or groups of servers may be positioned in geographically disparate locations (e.g., at different data centers, at different virtual machines (VMs), etc.), or may be positioned together in a single location. In some cases, one or more servers in the system may be grouped into server clusters for purposes of maintenance, testing, updating, and/or upgrading. For example, a first server cluster may include four servers, a second server cluster may include two servers, a third server cluster may include two servers, and a fourth server cluster may include three servers. Maintenance, testing, updating, or upgrading may be strategically performed at all of the servers in the cluster, such that the system maintains knowledge that all of the servers in the cluster are in maintenance, experiencing an outage for testing/updating/upgrading purposes, or is simply in standby mode as a backup server. Moreover, the content stored in a server of a first server cluster may be duplicated or replicated in a server of a second server cluster, to ensure redundancies across the server clusters in case one or more of the servers within a cluster are unavailable or experiencing an outage. For example, a first server in a first server cluster may include the data for ten services or applications. The data for these ten services or applications also may be positioned in one or more servers of a second server cluster to ensure that if the server cluster of the first server is under maintenance, packets may instead be forwarded to the one or more servers in the second server cluster.

In some cases, different types of packets may be sent to different types of server clusters, in which the different types of server clusters may include an active mode server cluster and a maintenance or standby mode server cluster. An active mode server cluster includes one or more servers operating in an active mode, in which the servers are operating under, normal baseline conditions as expected by the system. Standard sources (also referred to herein as "clients") may transmit packets destined for a server operating in an active mode. The packets transmitted by these clients are not used for the purpose of maintenance, testing, upgrading, or updating of the servers. Instead, these packets may relate to any other function, application, service, call, website, etc. requested by a device, computing system, subscriber of a network, etc. Meanwhile maintenance, testing, upgrading, and/or updating sources (also referred to herein as "testers") may transmit packets destined for a server operating in a maintenance or standby mode. A server operating in a maintenance or standby mode may refer to a server that is operating under normal, baseline conditions because, for example, a maintenance task is being performed at the server, a test is being performed at the server, an upgrade is being performed to software or hardware at the server, an update is being performed to firmware of the server, the server is in standby mode, etc.

As mentioned above, server clusters may be grouped together such that when one server in a server cluster goes into a maintenance or standby mode, all of the remaining servers in the server cluster may also go into maintenance or standby mode. Similarly, server clusters may be grouped together such that all of the servers in a server cluster may operate in the same mode at the same time. While only the active mode, maintenance mode, and standby mode are mentioned here as examples, it should be appreciated that the servers and server clusters may operate under many different modes not otherwise described herein.

Within a load balancer, a VS application receives packets from one or more sources (e.g., clients or testers), which may then be forwarded to a load balancing application associated with a particular pool. The load balancing application may then determine which server cluster and server within the server cluster to forward the packet based on various load balancing factors, such as, for example, a load across the servers in the system and the servers in a server cluster.

However, server clusters may switch between different modes over the course of time based on a status of the servers within the server cluster (i.e., whether the server is in maintenance, standby, or operating under normal conditions). For example, suppose there are two server clusters each operating similar services for purposes of redundancy at a first time, with a first server cluster including two servers and being in an active mode, and a second server cluster including two servers and being in a standby mode. At a second time after the first time, the first server cluster may go into a maintenance mode, in which case the second server cluster may be placed into an active mode to operate under normal conditions and ensure processing of the packets by the services. At this point the server clusters have switched between active mode and standby mode.

This switch may be problematic because the VS application receiving packets from the clients may continue to route the packets to the first server cluster, which is now under maintenance (i.e., that the packets may still be forwarded to the first server cluster even though the packets should not be processed at the first server cluster). Meanwhile, another VS application receiving packets from the testers may continue to route the packets to the second server cluster, which is now in an active mode (i.e., these packets from the testers may not need to be processed by the normally operating servers in the second server cluster). Therefore, communication pathways between the VS application and the servers may need to be changed to avoid errors that may be caused by routing packets into the wrong server cluster. These errors may include dropped packets, a failure at a server, or a fault along the communication path to the server. To prevent these errors manual reconfiguration of the paths from the respective VS application to the server may need to be performed. For example, an operator of the system may need to reconfigure the entire load balancer, from the VS applications, the load balancing applications, to the member nodes identifying servers in a server cluster, to reroute the packets from the appropriate VS application to the correct server cluster. For example, suppose there are ten VS applications running on the load balancer, each pointing to a particular service on a server in the first server cluster at the first time when the first server cluster is in the active mode. When the first server cluster goes into the maintenance mode, each of the paths from the ten VS applications to the services at the first server cluster may need to be individually rerouted to the corresponding services at the second server cluster operating in the active mode.

This path-by-path reconfiguration when a server cluster switches between modes is largely wasteful from a resource consumption standpoint, because the individual reconfiguration of lines within the load balancer may require a heavy load of processing, networking, and power resources. In some cases, this reconfiguration may even need to be performed manually by an operator, leaving the reconfiguration prone to human errors, which can sometimes lead to a completely incorrect configuration of the system. This incorrect configuration may again lead to outages, dropped packets/calls, failures, and faults within the load balancer and the servers themselves.

The present disclosure addresses the foregoing technical problems by providing a technical solution in the technical field of load balancing between sources and servers in a communication system architecture. The embodiments disclosed herein perform load balancing for multiple different flows of traffic using a single parameter. As further described herein, the parameter may be used with a rule programmed at each VS application to determine a server or server cluster toward which to forward packets from a source. Instead of performing a path-by-path reconfiguration when a server cluster switches between modes, which as described above is heavily resource intensive, the VS applications may automatically determine the pool through which to route packets to a proper server or server cluster by inputting the parameter to a pre-programmed rule, as further described herein. The main benefit of these embodiments involves the drastic reduction in overall number of settings that may need to be touched during traffic switchover, which leaves very little room for human errors, especially considering that most load balancer configuration changes, particularly the direction of traffic, may be done during low traffic hours (in the middle of the night), when the probability of human errors is higher.

In an embodiment, a load balancer may include one or more VS applications. In a first embodiment, the load balancer may include multiple VS applications, which may each correspond to different sources, back end servers, applications, services, etc. For examples, the load balancer may include one VS application to receive packets from clients, another VS application to receive packets from testers, and so on for different types of sources. As another illustrative example, the load balancer may include one VS application to receive packets destined for a first type of service at a back end server, another VS application to receive packets destined for a second type of service at a back end server, and so on for different types of services. In this embodiment, the VS application may be associated with an identifier or address identifying the VS application and a port number, in which the port number may be included in the header of the packets being forwarded to the particular VS application.

In a second embodiment, the load balancer may include a single VS application, which may also be associated with an identifier or address and a port number. In this embodiment, the VS application may receive all the packets from all different types of sources and destined for all different types of services. The VS applications may use contextual data of a packet to determine a source of the packet or a type of the packet (e.g., packet from a client or a packet from a tester). The contextual data of the packet may include, for example, an identifier or address of the source, data describing the source, data describing a destination service or application, contents of the packet, etc. In this embodiment, the VS application may first determine the source of the packet or the type of packet, and use this determination with the parameter and the rules programmed at the VS application to forward the packets to one or more pools.

In either embodiment, the parameter may be a value stored in a data store external to the load balancer, but accessible by all of the load balancers across the system and all of the VS applications within each of the load balancers of the system. The parameter may change in value based on changes in the status of one or more servers in a server cluster. The one or more servers in the server cluster may change status when, for example, a server in the server cluster goes in or out of maintenance mode, standby mode, or active mode. This parameter change may be manually performed by an operator of the system, or may be automatically performed by a parameter application, which has access to the status of each of the servers and server clusters in the system.

Each of the VS applications may be pre-programmed with one or more rules, in which each of the rules includes a set of logic that may be used to determine whether to route the packets to a default server cluster (and thus a server within the default server cluster) or to a switched server cluster (and thus a server within the switched server cluster). For example, the rule may indicate that when the parameter is set to 0 and the source of the packet is a client, then the packet is to be forwarded to a default cluster server through a particular pool. For example, the rule may also indicate that when the parameter is set to 1 and the source of the packet is a tester, then the packet is to be forwarded to another default cluster server through a different pool. In some cases, the default cluster servers and pools for each of the foregoing examples may be different. For example, the default cluster server for packets from clients may be a first cluster server, and the pool for packets from clients may be a first pool. Meanwhile, the default cluster server for packets from testers may be a second cluster server, and the pool for packets from testers may be a second pool. In other cases, the default cluster servers and pools for the different sources may be the same.

The rules may also be used to efficiently switch between different pools and cluster servers as at least one of the parameter value changes, the type of source from which the packet is received changes, the type of application or service to which the packet is destined for changes, etc. For example, when a first server cluster goes into maintenance mode, another corresponding second server cluster, that was previously in maintenance or standby mode, may go into active mode to ensure packets are not dropped. However, in such a case, client traffic may need to be rerouted to the second server cluster, while tester traffic may need to be rerouted to the second server cluster. In an embodiment, an operator or a server application may set or change a value of a parameter to a certain value, which may indicate to all VS applications using the rule that the first server cluster is under maintenance and the second server cluster is active.

The VS applications may automatically determine the pool through which to route packets to a proper server cluster by inputting the parameter to a pre-programmed rule. The VS application may also input other data into the rule, such as, for example, an identification of the source of the packet, an identification of a destination of the packet, etc., to output an identifier of a pool or a load balancing application in the load balancer toward which to forward the packet, which may then forward the packet to the corresponding server cluster. In the aforementioned example, for packets from clients, the new parameter may be input into the rule of the VS application to output an identifier of the pool corresponding to the second server cluster, which may be the switch server cluster (i.e., not the default server cluster for packets from clients as programmed by the system). Similarly, for packets from testers, the new parameter may be input into the rule of the VS application to output an identifier of the pool corresponding to the first server cluster, which may also be the switch server cluster (i.e., not the default server cluster for packets from testers as programmed by the system).

Once the VS application performs the parameter-based rule execution to determine the pool toward which to forward the packets, the load balancing application at the pool may receive the packets. The load balancing application may perform the actual load balancing between the servers attached to the pool, to determine which server in the server cluster to pass the packets to based on a server load across the servers.

In this way, the embodiments disclosed herein serve to conserve processing and power resources at the system by reducing the computations performed to reconfigure communication paths to servers when servers or server clusters go in and out of maintenance. To this end, the embodiments disclosed herein have a relatively light footprint because the computations are all performed locally at the VS applications using a single parameter stored in a data store accessible over a network. Moreover, by automating the process of identifying changes in statuses of servers and updating the parameters accordingly, errors (both human error and otherwise) are greatly reduced in the reconfiguration process, preventing outages and dropped calls/packets in the system. Therefore, in general, the embodiments disclosed herein also serve to increase system capacity by decreasing system outages and drops.

Turning now to FIG. 1, a communication system 100 is described. The communication system 100 may include sources 103A-N, a load balancer 106, server clusters 109A-B, a data store 112, a parameter application 115 that executes on a server 116, and a network 117. The sources 103A-N, load balancer 106, server clusters 109A-B, data store 112, and parameter application 115 (e.g., via server 116) may communicate in a wired or wireless fashion via the network 117. The network 117 may be one or more private networks, one or more public networks, or a combination thereof.

The sources 103 may be any physical device, such as, for example, cell phone, a mobile phone, a smart phone, a personal digital assistant (PDA), an Internet of things (IoT) device, a wearable device, an AR device, a headset device, a laptop computer, a tablet computer, a notebook computer, a medical device, a vehicle computer, etc. The sources 103 may also be virtual entities, such as, for example, a virtual machine (VM), a virtual network function (VNF), a virtual private network (VPN), applications, services, etc. In the example shown in FIG. 1, the sources 103 include the client sources 103A, which as described above, transmit data communication packets destined for a server operating in an active mode. The sources 103 may also include tester sources 103B, which as described above, transmit packets that may be used for the purpose of maintenance, testing, upgrading, or updating any of the servers in a server cluster 109A-B (i.e., a server operating in a maintenance or standby mode). While only two examples of sources 103 are shown in FIG. 1, it should be appreciated that the sources 103 may include any other types of sources 103N not otherwise shown in FIG. 1 or described herein, so long as the sources 103N may transmit packets and data through the load balancer 106 to servers in the server clusters 109A-B. The packets may be Transmission Control Protocol (TCP) packets, Internet Protocol (IP) packets, or other types of packets formatted according to another data communication protocol. The packets may comprise a header portion and a data portion, where the header portion carries information about the packet (e.g., one or more of a source address, a destination address, a time, a time to live, a sequence number, or other information about the packet or communication infrastructure) and where the data portion carries the actual communication content (e.g., what the endpoints of the communication are conveying over the communication link). It is well known that various forms of communication (e.g., voice calls, video streams, email, and others) may be formatted into a sequence of packets for transmission over a communication network, such as, for example, network 117.

The load balancer 106 may be implemented as a hardware solution, for example, in a computer system such as the computer system 700 of FIG. 7 further described below. The load balancer 106 may alternatively be implemented as a software-based solution, in which the load balancer 106 may be an application executed as instructions stored on a memory and accessible by a processor, which when executed may perform the functions of the load balancer 106 disclosed herein. The load balancer 106 may include one or more VS applications 120 communicatively coupled to one or more pools 123A-C.

Each of the pools 123A-C may refer to or point to a grouping or collection of backend servers that share a workload, such that incoming traffic or application requests are distributed across multiple servers associated with a pool 123A-C to ensure optimal resource utilization, improved performance, and high availability. The pools 123A-C may be redefined over time, for example, by an operator of the load balancer 106. For example, additional servers may be added to a pool 123A-C to handle increased traffic, and servers may be removed or replaced from a pool 123A-C without disrupting services to customers.

The VS applications 120 may receive packets from the sources 103. The VS applications 120 may be pre-programmed with one or more rules 126. Each rule 126 may include a set of logic that may be used to determine which pool 123A-C, and thus which servers or server clusters 109A-B to which to forward the packet. Each rule 126 may receive various factors as input, such as, for example, an identifier or address of a source 103, an identifier or address of a destination, and the current parameter 130, which is stored at the data store 112 over the network 117. The rule 126 may execute the logic based on the input to generate an output, which may be an identifier of the pool 123A-C (an identifier of a respective load balancing application 133A-C, or an identifier of a server or a server cluster 109A-B) toward which to route the packets.

Once the VS application 120 identifies a pool 123A-C toward which to route the packets, the VS application 120 may forward the packets to a load balancing application 133A-C of the identified pool 123A-C. To this end, each of the pools 123A-C may include one or more load balancing applications 133A-C, which may be instructions stored on a memory and executable by a processor, which when executed, perform the functions to manage how the load is balanced between the servers associated with the pool 123A-C based on various load balancing factors and various different types of load balancing algorithms. The load balancing factors may include, for example, load balancing factors may include server health, geographic location, server persistence, content-based routing, server capacity, server resources, associated costs, security considerations, quality of service requirements, server priorities, etc. In this way, load balancing in some cases is performed based on not just the load at the servers 140A-D, but also other load balancing factors, each of which may be considered in the different types of load balancing algorithms.

As shown in FIG. 1, each pool 123A-C may manage the load among the servers and server clusters 109A-B by maintaining member nodes 136A-H, that may each respectively correspond and identify an actual server 140A-D in the system 100. Each member node 136A-H may correspond to an identifier or address of a server 140A-D in the system. As shown in FIG. 1, pool 123A may include member nodes 136A-D, which may each respectively identify servers 140A-D. To this end, pool 123A is associated with or attached to (i.e., in a manner in which the respective load balancing application 133A may control the load at) the servers 140A-D across multiple server clusters 109A-B based on various load balancing factors. Meanwhile, pool 123B includes two member nodes 136E-F, which may each respectively identify servers 140A-B in the server cluster 109A. Similarly, pool 123C includes two member nodes 136G-H, which may each respectively identify servers 140C-D in server cluster 109B. In this way, pool 123B may only be associated with server cluster 109A, while pool 123C may only be associated with server cluster 109B.

To this end, each server cluster 109A-B may include one or more servers 140A-D. The servers 140A-D across the server clusters 109A-B may include some redundancies, such that when one server cluster 109A-B goes into a maintenance or standby mode, another server cluster 109A-B may go into an active mode to satisfy requests from various sources 103 (which may come in the form of the aforementioned packets).

While only three pools 123A-C are shown in the load balancer 106, it should be appreciated that the load balancer 106 may include any number of pools 123A-C. It should also be appreciated that the pools 123A-C may include any number of member nodes 136A-H, and thus any corresponding number of servers 140A-D. Similarly, it should be appreciated that there may be any number of servers 140A-D in each server cluster 109A-B, and there may be any number of server clusters 109A-B in the system 100.

Each of the servers 104A-D in a server cluster 109A-B may either be located in a same general physical vicinity or may be located in geographically disparate locations, even worldwide. In some cases, a subset of the servers 140A-D in a server cluster 109A-B may be located in the same physical vicinity, while another subset of the servers 140A-D in a server cluster 109A-B is located in another location.

For example, each of the servers 140A-D may be a collection of processing and storage resources (e.g., memories), which may be located across one or more data centers and implemented as cloud data storage. As another example, each of the servers 140A-D may be implemented as smaller scale computer systems with memories, mobile edge computing resources with memories, mobile switching offices, or any other smaller scale storage resource locations. As yet another example, the servers 140A-D may be implemented as VMs, for example, running in a VM platform. In this way, the servers 140A-D may be implemented in a variety of different ways in the system 100.

The data store 112 may also be a collection of storage resources and memories located in the system 100, accessible by the load balancer 106 via the network 117. The data store 112 may include the parameter 130 or a server load 145. The parameter 130 may be a value reflecting a current state of the servers 140A-D in the system 100, and may be used as an input into the rules 126 to determine how to forward traffic to various pools 123A-C in the load balancer 106. The current state of the servers 140A-D may indicate which servers 140A-D (or server clusters 109A-B) are in an active mode and which servers 140A-D (or server cluster 109A-B) are in a maintenance or standby mode. The value of the parameter 130 may be a unique value corresponding to the current state of servers 140A-D. The value of the parameter 130 may also be, for example, set to 0 to indicate a default state of the servers 140A-D.

The value of the parameter 130 may change over time as the state of the servers 140A-D and server clusters 109A-B changes over time. In one case, the parameter change may be manually performed by an operator of the system 100. For example, the parameter 130 may be changed manually via a load balancer command line interface (CLI) and/or a graphical user interface (GUI). An operator may otherwise manually change the parameter 130 by editing the parameter 130 or file at the data store 112, or by manually initiating an application programming interface (API) call to the load balancer 106 to change the parameter 130. In other cases, the parameter application 115 may be responsible for automatically detecting changes in the state of the servers 140A-D and server clusters 109A-B, and updating the parameter 130 accordingly. For example, the parameter application 115 may be instructions stored on a memory and executable by a processor of server 116, which when executed, causes the processor to automatically detect changes in the state of the servers 140A-D and server clusters 109A-B, and update the parameter 130 accordingly. In an embodiment, the servers 140A-D may send updates to the parameter application 115 every time a status of the server 140A-D changes (e.g., to maintenance mode, standby mode, active mode). The parameter application 115 may receive the status changes of the servers 140A-D and server clusters 109A-B and update the parameter 130 based on, for example, some logic pre-programmed in the parameter application 115 that may map the status of the servers 140A-D and server clusters 109A-B to a value that may be processed by the rules 126 to determine routes for packets through the load balancer 106. In this way, the parameter application 115 is responsible for setting the parameter 130, which may control a flow of traffic from multiple different sources 103.

The server load 145 may indicate a current usage or consumption at each of the servers 140A-D (or server clusters 109A-B). The load balancing applications 133A-C may use the server load 145 to perform load balancing across all of the associated servers 140A-D (or server clusters 109A-B) to distribute packets and traffic from multiple sources simultaneously in an equal manner. This may prevent one server 140A-D (or server cluster 109A-B) from getting overloaded (and thereby causing various systematic issues in providing services to the sources 103).

Figure 2A:
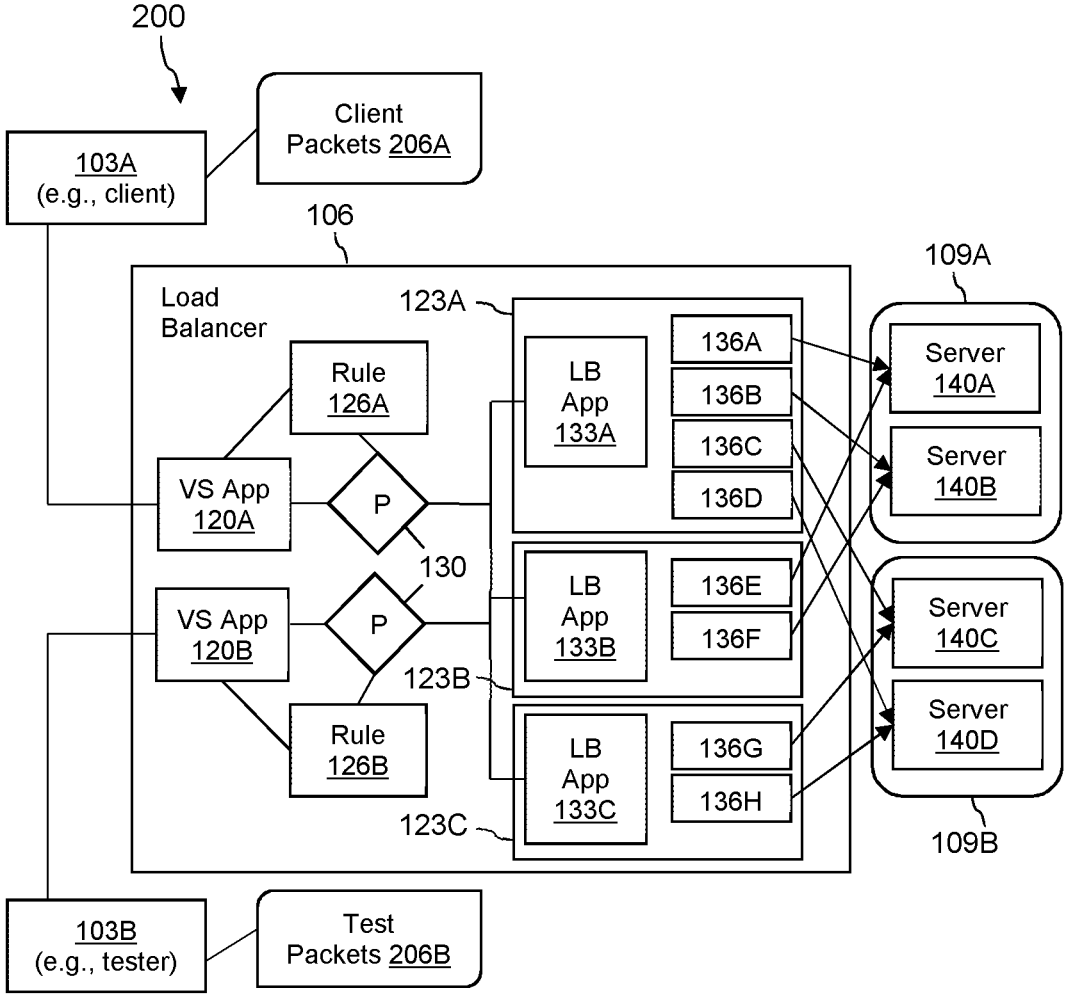
FIGS. 2A-B are block diagrams illustrating an operation of the load balancer in the communication system of FIG. 1 according to various embodiments of the disclosure.
Figure 2B:
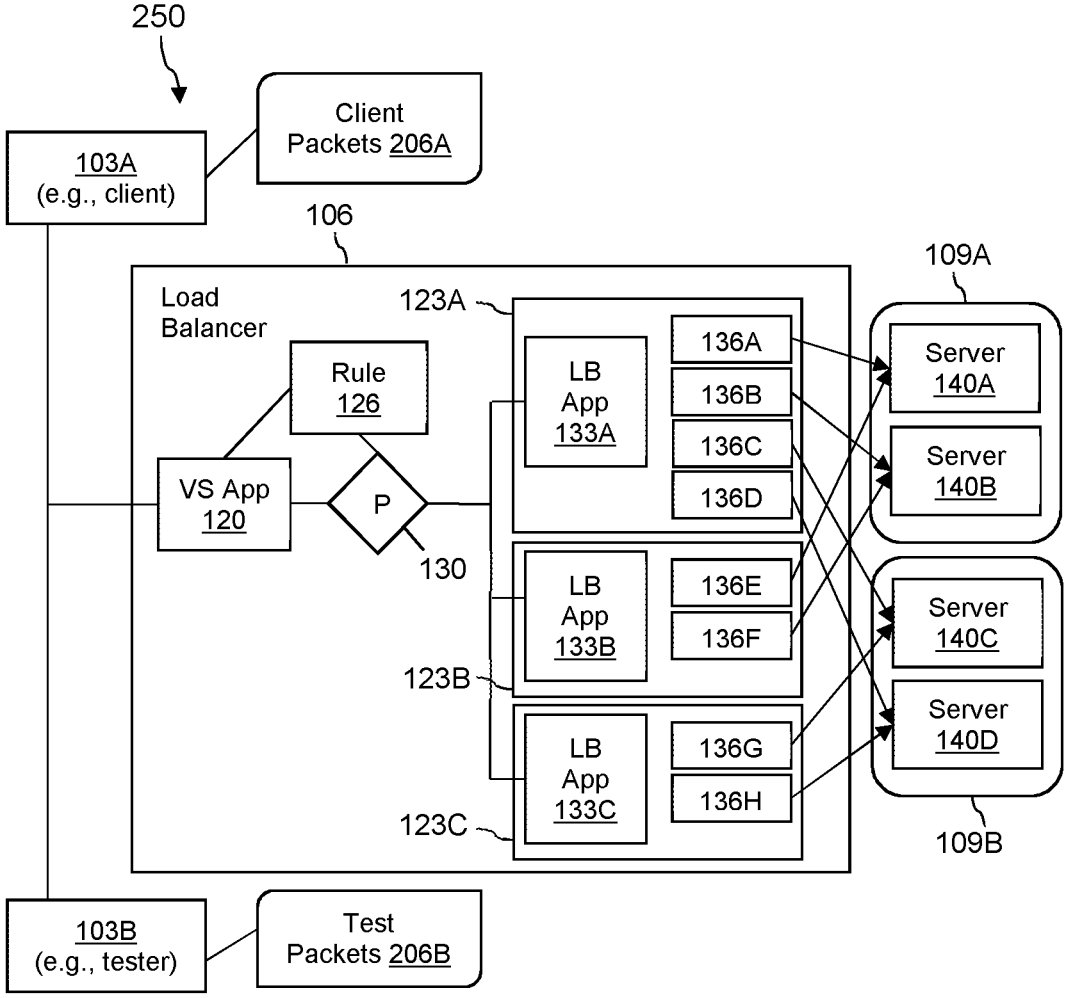

Referring now to FIGS. 2A-B, shown are block diagrams illustrating an operation of the load balancer 106 in the communication system 100. Specifically, FIGS. 2A-B show a portion 200, 250 of the communication system 100, including the sources 103, the load balancer 106, and the server clusters 109A-B. However, the load balancer 106 of FIG. 2A includes multiple VS applications 120A-B, while the load balancer 106 of FIG. 2B includes only one VS application 120.

Turning specifically now to FIG. 2A, shown is the portion 200 of the communication system 100 of FIG. 1. Portion 200 of the communication system 100 includes sources 103, specifically the client sources 103A and the tester sources 103B. Portion 200 also shows the load balancer 106, which is similar to the load balancer 106 of FIG. 1, except that FIG. 2A additionally shows the decision regarding the parameter 130 being applied to the rules 126A-B, which is made prior to forwarding traffic (e.g., one or more packets 206A-B) to respective pools 123A-C. Portion 200 also includes the server clusters 109A-B, including servers 140A-D.

In FIG. 2A, the client sources 103A may generate client packets 206A, which may be data packets or control packets carrying data to be forwarded to one of the servers 140A-D for processing. Similarly, the tester source 103B may generate test packets 206B, which may also be data packets or control packets to be forwarded to one of the servers 140A-D for processing. The client packets 206A may be destined for a server operating in an active mode under normal baseline conditions. The client packets 206A may not be used for the purpose of maintenance, testing, upgrading, or updating any of the servers 140A-D in a server clusters 109A-B. Instead, these client packets 206A may relate to any other function, application, service, call, website, etc. requested by a device, computing system, subscriber of a network, etc. Meanwhile, the test packets 206B may be destined for a server operating in a maintenance mode or standby mode. The test packets 206B may be used for the purpose of maintenance, testing, upgrading, and/or updating any of the servers 140A-D in the server cluster 109A-B.

The client source 103A may add an identifier or address of the VS application 120A to the client packets 206A. For example, the client sources 103A may be pre-configured with the identifier or address of the VS application 120A responsible for client packets 206A, or the client sources 103A may receive the identifier or address of the VS application 120A responsible for the client packets 206A from a data store accessible by the client sources 103A and the load balancer 106. The identifier or address of the VS application 120A may be a port number of the VS application 120A or an Internet Protocol (IP) address of the VS application 120A.

Similarly, the tester source 103B may add an identifier or address of VS application 120B to the test packets 206B. For example, the tester sources 103B may be pre-configured with the identifier or address of the VS application 120B responsible for test packets 206B, or the tester sources 103B may receive the identifier or address of the VS application 120B responsible for the test packets 206B from a data store accessible by the tester sources 103B and the load balancer 106. The identifier or address of the VS application 120B may be a port number of the VS application 120B or an IP address of the VS application 120B. When a source 103A-B sends packets 206A-B through the load balancer 106, the source 103A-B may include the identifier of the VS application 120A-B in the packets 206A-B, such that the packets 206A-B are routed to the appropriate VS application 120A-B in the load balancer 106. While FIG. 2A shows the VS applications 120A-B corresponding to different sources 103A-B, the VS applications 120A-B may also correspond to different back end servers 140A-D, different applications or services executed on the back end servers 140A-D, and/or any other aspect of the system 100.

The respective VS applications 120A-B may be programmed with one or more rules 126A-B defining which pool 123A-C, and thus which server cluster 109A-B or servers 140A-D within the server clusters 109A-B, toward which to forward the packets 206A-B. The rules 126A-B may be based on the parameter 130, which as described above with reference to FIG. 1, may be stored in a data store 112 accessible by the load balancer 106. The rules 126A-B may also be based on an identifier of the sources 103A-B from which the packets 206A-B originated and/or an identifier of the destination application, service, device, or server 140A-D of the packets 206A-B. As shown in FIG. 2A, each VS application 120A and 120B is attached to a unique rule 126A and 126B, respectively. In other words, the rule 126A of the VS application 120A is different from the rule 126B of the VS application 126B.

For example, the VS application 120A-B may request the parameter 130 from the data store 112 and receive the parameter 130 from the data store 112 via messages or application programming interface (API) calls. The VS application 120A-B may input the parameter 130, with other data, into the rule 126A-B to output an identifier or address of the pool 123A-C (or load balancing application 133A-C) toward which to forward the packets 206A-B. The VS application 120A-B may then forward the packets 206A-B to the load balancing application 133A-C of the identified pool 123A-C. The load balancing application 133A-C then may determine the member node 136A-H corresponding to the server 140A-D toward which to forward the packets 206A-B, as described herein.

As an illustrative example, suppose the parameter 130 is set to 0, and the VS application 120A receives the client packets 206A. The VS application 120A may receive the parameter 130 from the data store 112, and pass the parameter 130 as input into the rule 126A. The output of the rule 126A may be an identifier of the load balancing application 133A, which may be a default pool for the client packets 206A. The default pool corresponds to multiple server clusters 109A-B, both of which may be in an active mode. Subsequently, server cluster 109A may enter into a maintenance mode, such that client packets 206A should no longer be routed to the server cluster 109A, through the default pool 123A. In this case, the parameter application 115 may detect the change in the status to the server cluster 109A, and update the parameter 130 to reflect the change in the status to the server cluster 109A. Subsequently, the VS application 120A may receive additional client packets 206A, and then receive the updated parameter 130 from the data store 112. The VS application 120A passes the updated parameter 130 as input into the rule 126A. The output of the rule 126A may be an identifier of the load balancing application 133B, which may be a switched pool for the client packets 206A, attached to a switched server cluster 109B. In this way, the update of the parameter 130 alone automatically enabled the VS application 120A to switch and change paths for client packets 206A in an efficient and effective manner. Similar steps may be performed simultaneously by VS application 120B for test packets 206B, in which again updating the parameter 130 alone may automatically enable the VS application 120B to switch and change paths for test packets 206B in an efficient and effective manner.

Turning specifically now to FIG. 2B, shown is the portion 250 of the communication system 100 of FIG. 1. Portion 250 of the communication system 100 shown in FIG. 2B is similar to portion 200 of the communication system 100 shown in FIG. 2A, except that portion 250 only includes one VS application 120. The single VS application 120 receives packets 206A-B from all of the different types of sources 103A-B, and processes the packets 206A-B to determine the type of source 103A-B of the packets 206A-B based on a contextual data of the packets 206A-B (an identifier of a source 103 of the packets 206A-B, an identifier of a destination application, service, or device of the packets 206A-B, the contents within the packets 206A-B, etc.). The source 103A-B of the packet 206A-B may be, for example, clients, testers, or any other type of source 103A-B.

The rule 126 of the VS application 120 in this embodiment shown in FIG. 2B may also be additionally programmed to receive the determined type of source 103A-B as input to the rule 126. In this way, the VS application 120 may input the parameter 130, the type of source 103A-B, and any other data into the rule 126, such that the logic of the rule 126 uses the parameter 130 and the type of source 103A-B to determine an identifier or address of the pool 123A-C toward which to forward the packets 206A-B. The packets 206A-B may then be forwarded to the pools 123A-C and the server clusters 109A-B or servers 140A-D accordingly.

Figure 3:
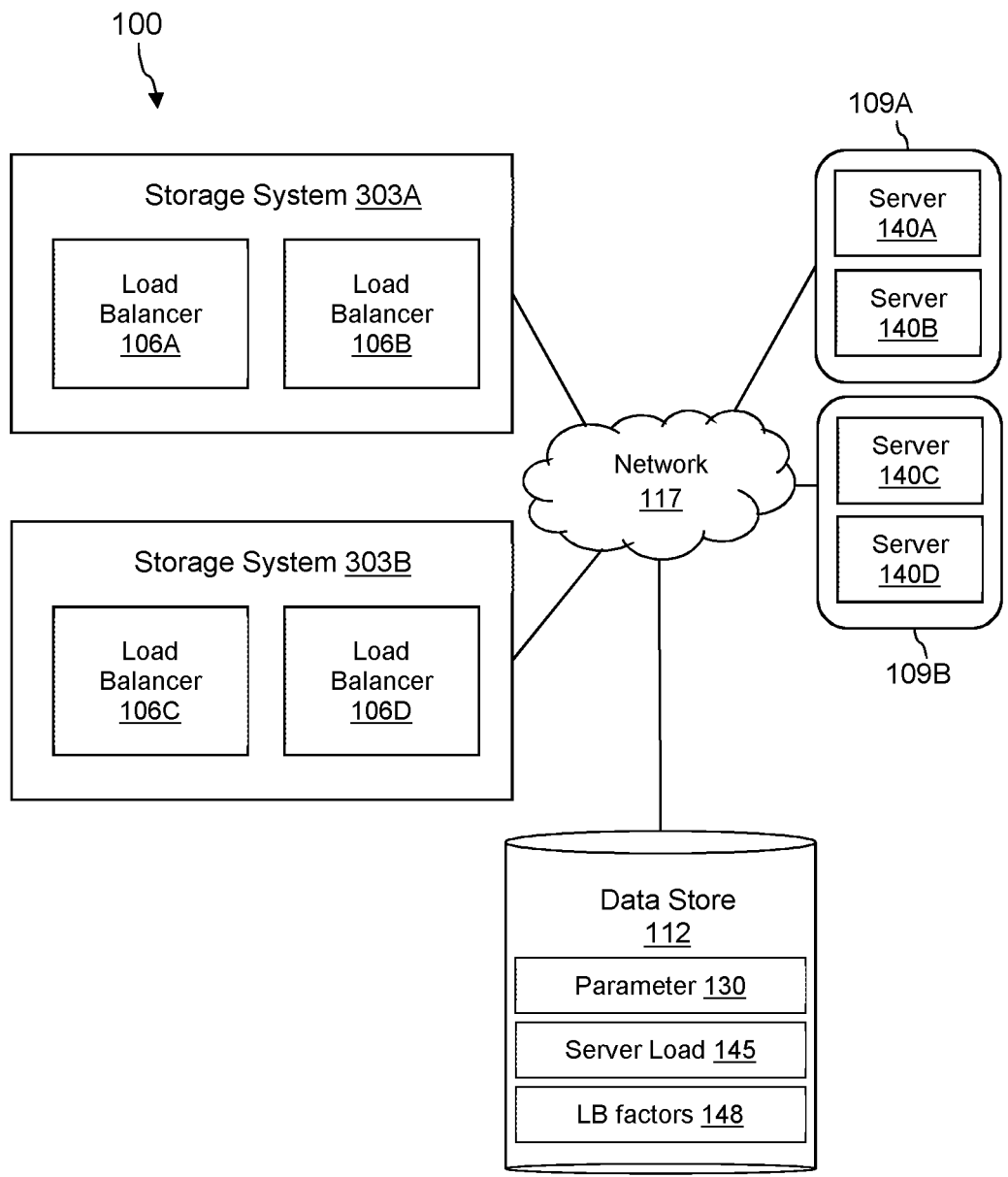
FIG. 3 is a block diagram illustrating the communication system of FIG. 1 further including multiple storage systems, each include multiple load balancer, according to various embodiments of the disclosure.

Referring now to FIG. 3, shown is a block diagram illustrating the communication system 100 of FIG. 1 further including multiple storage systems 303A-B, each including multiple load balancers 106A-D, according to various embodiments of the disclosure. For example, the storage centers 303A-B may each correspond to network appliances or data centers, which may additionally contain other resources, such as, firewalls, switches, routers, and other network appliances. Each of the storage systems 303A-B may correspond to a collection of storage resources and memories, which may include the load balancers 106A-D or be coupled to the load balancers 106A-D. Each storage system 303 may communicate with the server clusters 109A-B, the individual servers 140A-D, and the data store 112 over the network 117. While the storage system 303A-B, server clusters 109A-B, and the data store 112 are shown as external to the network 117, it should be appreciated that in some embodiments, the storage system 303A-B, server clusters 109A-B, and the data store 112 may be included as part of the network 117. In some cases, the data store 112 may be part of one or both of the storage systems 303A-B.

The load balancers 106A-D may each include components similar to the load balancer 106 shown in FIG. 1. As shown in FIG. 3, all of the load balancers 106A-D across the different storage systems 303A-B may use the same parameter 130, stored in the data store 112. More specifically, all of the VS applications 120 in each of the load balancers 106A-D may use the same parameter 130, even though the load balancers 106A-D may be located in different storage systems 303A-B.

In this way, the rules 126 programmed at the VS applications 120 across all of the load balancers 106A-D in the system 100 enable each of the VS applications 120 to output different paths to the servers 140A-D using the same parameter 130. This parameter 130 may change value over time, either manually or automatically as described herein, as the status of one or more servers 140A-D changes from active to maintenance or standby. The logic of the rules 126 may remain constant, or adjusted over time, as the value of the parameter 130 changes over time, to change the paths from the VS applications 120 to the servers 140A-D.

Therefore, the embodiments disclosed herein enable the switch of multiple traffic flows at the same time changing a single external variable, i.e., the parameter 130. Therefore, changes may be made throughout the system 100 seamlessly without the sources 103 having knowledge of any changes to the system. The changes may also be made to the system 100 while still ensuring system performance application delivery, reliability, scalability, and availability.

Referring now to FIG. 4, shown is a method 400 implemented in the communication system 100 of FIG. 1 to perform load balancing across multiple traffic flows. Method 400 may be performed by the load balancer 106, and specifically the VS application 120 and the load balancing applications 133A-C within the load balancer 106. Method 400 may be performed to implement load balancing of data across servers 140A-D in response to multiple traffic flows, which may be packets 206A-B coming from different types of sources 103A-B. Specifically, method 400 illustrates the ability of the load balancer 106 to control multiple different traffic flows from multiple different sources 103A-B simultaneously using a single parameter 130, which may change in value over time.

At step 403, method 400 comprises receiving, by a first VS application 120A in a load balancer 106 of the communication system 100, client packets 206A from a client source 103A. At step 405, method 400 comprises receiving, by a second VS application 120B in the load balancer 106, test packets 206B from a tester source 103B.

At step 409, method 400 comprises obtaining, by the first VS application 120A, a parameter 130 from a data store 112 communicatively coupled to the load balancer 106. At step 411, method 400 comprises determining, by the first VS application 120, a selected pool 123A-C and a load balancing application 133A-C in the load balancer 106 toward which to forward the client packets 206B based on a first rule 126 programmed at the first VS application 120A and the parameter 130. At step 415, method 400 comprises forwarding, by the first VS application 120, the client packets 206A to the selected pool 123A-C and the load balancing application 133A-C, in which the selected pool 123A-C is associated with an active server cluster 109A-B comprising one or more servers 140A-D operating in an active mode.

At step 417, method 400 comprises obtaining, by the second VS application 120B, the parameter 130 from the data store 112. At step 421, method 400 comprises determining, by the second VS application 120B, a test pool 123A-C and a test load balancing application 133A-C in the load balancer 106 toward which to forward the test packets 206B based on a second rule 126 programmed at the second VS application 120B and the parameter 130. At step 423, method 400 comprises forwarding, by the second VS application 120B, the test packets 206B to the test pool 123A-C and the test load balancing application 133A-C, in which the test pool 123A-C is associated with a server cluster 109A-B comprising one or more servers 140A-D operating in a maintenance or standby mode.

Method 400 may include other steps and/or features that are not otherwise shown in FIG. 4. For example, the client packets 206A may identify the first VS application 120A, and the test packets 206B may identify the second VS application 120B. In an embodiment, when the parameter 130 is a first value, the first rule 126 indicates that the client packets 206A are to be routed to a client default load balancing application 133A-C in a default pool 123A-C corresponding to a client default server cluster 109A-B, and when the parameter 130 is a second value, the first rule 126 indicates that the client packets 206A are to be routed to a switched load balancing application 133A-C in a switched pool 123A-C corresponding to a client switched server cluster 109A-B. Similarly, in an embodiment, when the parameter 130 is a first value, the second rule 126 indicates that the test packets 206B are to be routed to a test default load balancing application 133A-C in a test default pool 123A-C corresponding to a test default server cluster 109A-B, and wherein when the parameter 130 is a second value, the first rule 126 indicates that the test packets 206B are to be routed to a test switched load balancing application 133A-C in a test switched pool 123A-C corresponding to a test switched server cluster 109A-B. In an embodiment, the parameter 130 is a single alphanumeric value that, when provided as input to the first rule 126 or the second rule 126, indicates a respective pool 123A-C and/or a load balancing application 133A-C associated with a server cluster 109A-B toward which to forward traffic. In an embodiment, the first VS application 120A is pre-configured with the first rule 126, and the first rule 126 comprises a set of logic used to determine whether to route the client packets 206A to a default server cluster 109A-B or a switched server cluster 109A-B, in which the parameter 130 is provided as input to the logic and an identifier identifying either the default server cluster 109A-B or the switched server cluster 109A-B is output of the logic. Similarly, in an embodiment, the second VS application 120B is pre-configured with the second rule 126, and the second rule 126 comprises a set of logic used to determine whether to route the test packets 206B to a default server cluster 109A-B or a switched server cluster 109A-B, in which the parameter 130 is provided as input to the logic and an identifier identifying either the default server cluster 109A-B or the switched server cluster 109A-B is output of the logic.

Figure 5:
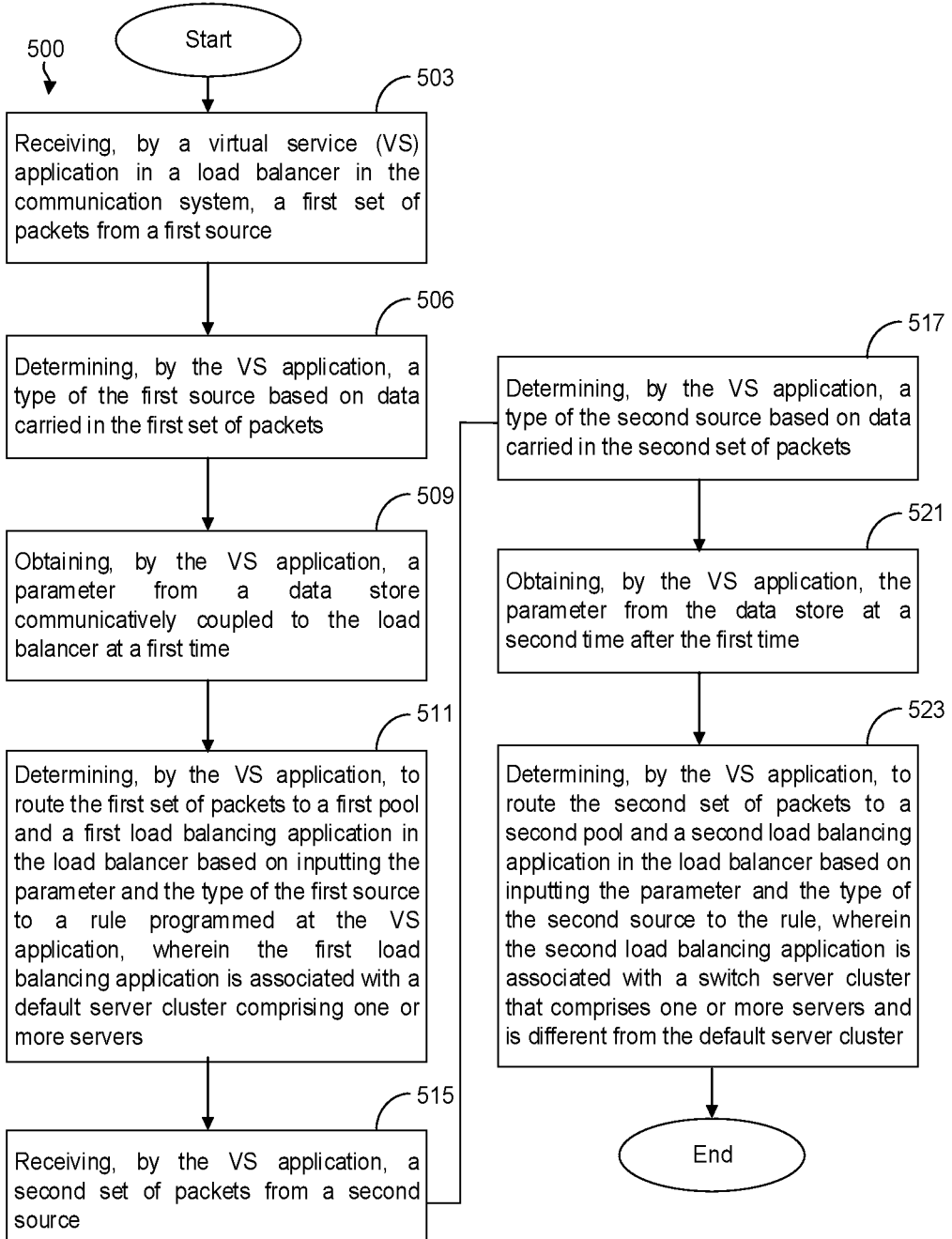
FIG. 5 is a flowchart of a second method of load balancing between multiple traffic flows according to various embodiments of the disclosure.

Referring now to FIG. 5, shown is a method 500 implemented in the communication system 100 of FIG. 1 to perform load balancing across multiple traffic flows. Method 500 may be performed by the load balancer 106, and specifically the VS application 120 and the load balancing applications 133A-C within the load balancer 106. Method 500 may be performed to implement load balancing of data across servers 140A-D in response to multiple traffic flows, which may be packets 206A-B coming from different types of sources 103A-B. Specifically, method 500 illustrates the ability of the load balancer 106 to switch the path of multiple different traffic flows from multiple different sources 103A-B simultaneously using a single parameter 130, which may change in value over time and the type of source.

At step 503, method 500 comprises receiving, by a VS application 120 in a load balancer 106 in the communication system 100, a first set of packets 206A from a first source 103A. At step 506, method 500 comprises determining, by the VS application 120, a type of the first source 103A based on data carried in the first set of packets 206A.

At step 509, method 500 comprises obtaining, by the VS application 120, a parameter 130 from a data store 112 communicatively coupled to the load balancer 106 at a first time. At step 511, method 500 comprises determining, by the VS application 120, to route the first set of packets 206A to a first pool 123A-C and a first load balancing application 133A-C in the load balancer 106 based on inputting the parameter 130 and the type of the first source 103A to a rule 126 programmed at the VS application 120, in which the first load balancing application 133A-C is associated with a default server cluster 109A-B comprising one or more servers 140A-D.

At step 515, method 500 comprises receiving, by the VS application 120, a second set of packets 206B from a second source 103B. At step 517, determining, by the VS application 120, a type of the second source 103B based on data carried in the second set of packets 206B. At step 521, method 500 comprises obtaining, by the VS application 120, the parameter 130 from the data store 112 at a second time after the first time. At step 523, method 500 comprises determining, by the VS application 120, to route the second set of packets 206B to a second pool 123A-C and a load balancing application 133A-B in the load balancer 106 based on inputting the parameter 130 and the type of the second source 103B to the rule 126, in which the second load balancing application 133A-C is associated with a switch server cluster 109A-B that comprises one or more servers 140A-D and is different from the default server cluster 109A-B.

Method 500 may include other steps and/or features that are not otherwise shown in FIG. 5. In an embodiment, the data carried in the first set of packets 206A and the second set of packets 206B comprise at least one of an identifier of the first source 103A or the second source 103B as carried in a header of the first set of packets 206A and second set of packets 206B or content of the first set of packets 206A and second set of packets 206B. In an embodiment, when the parameter 130 is a first value, the rule 126 indicates that the first set of packets 206A are to be routed to the default server cluster 109A-B, and when the parameter 130 is a second value, the rule 126 indicates that the second set of packets 206B are to be routed to the switched server cluster 109A-B. In an embodiment, the parameter is a single alphanumeric value. In an embodiment, when the first source 103A is a client, the default server cluster 109A-B comprises the one or more servers 140A-D that are operating in the active mode, when the first source 103A is a tester, the default server cluster 109A-B comprises the one or more servers 140A-D that are in a maintenance or standby mode.

Figure 6A:
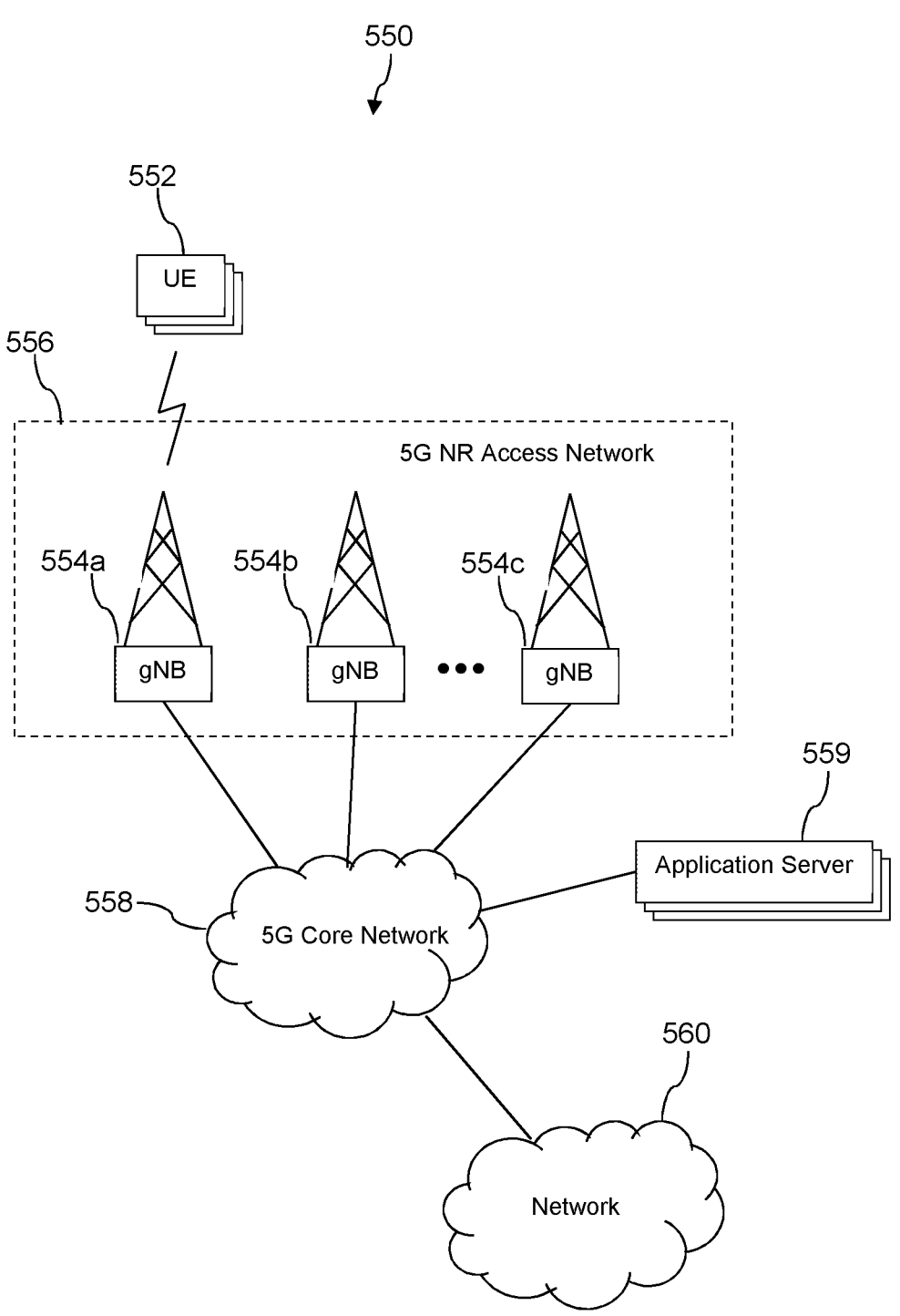
FIGS. 6A-B are block diagrams illustrating a communication system similar to the communication system of FIG. 1 according to an embodiment of the disclosure.

Turning now to FIG. 6A, an exemplary communication system 550 is described. In an embodiment, the communication system 100 of FIG. 1 may be implemented in the communication system 550. The communication system 550 includes a number of access nodes 554 that are configured to provide coverage in which UEs 552, such as cell phones, tablet computers, machine-type-communication devices, tracking devices, embedded wireless modules, and/or other wirelessly equipped communication devices (whether or not user operated), or devices such as end user device 102 and the source 103, load balancer 106, and/or server 117, can operate. The access nodes 554 may be said to establish an access network 556. The access network 556 may be referred to as RAN in some contexts. In a 5G technology generation an access node 554 may be referred to as a gigabit Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
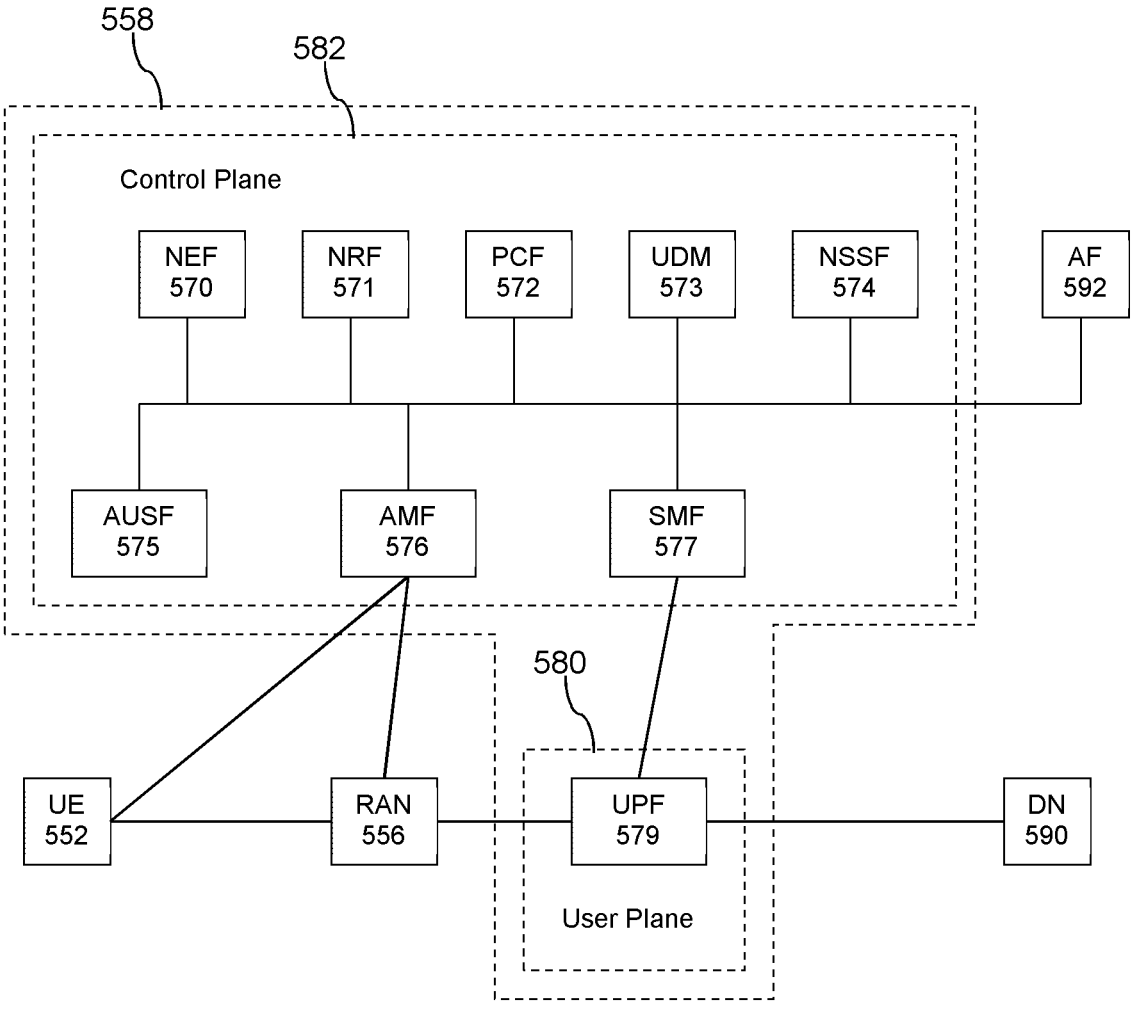

Turning now to FIG. 6B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 7:
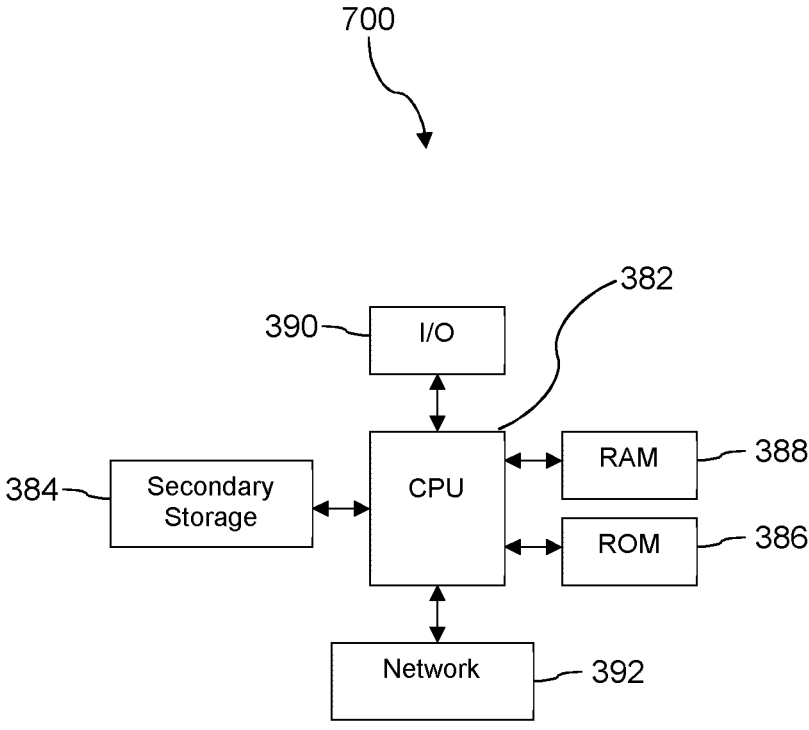
FIG. 7 is a block diagram of a computer system implemented within the communication system of FIG. 1 according to an embodiment of the disclosure.

FIG. 7 illustrates a computer system 700 suitable for implementing one or more embodiments disclosed herein. In an embodiment, load balancer 106, VS applications 120, load applications 133A-C, parameter application 115, sources 103, etc., may each be implemented as the computer system 700. The computer system 700 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 700, at least one of the CPU 382, the RAM 388, and the ROM 386 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 384, to the ROM 386, to the RAM 388, and/or to other non-volatile memory and volatile memory of the computer system 700. The processor 382 may process the executable instructions and/or data structures in part by directly accessing the computer program product, for example by reading from a CD-ROM disk inserted into a disk drive peripheral of the computer system 700. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 700.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A communication system, comprising:
at least one data store configured to store a parameter;
at least one processor;
at least one memory coupled to the processor;
a virtual service (VS) application, stored in the at least one memory, which when executed by the at least one processor, causes the at least one processor to be configured to:
   determine to route a first packet to a first server cluster at a first time in response to applying the parameter to a rule programmed at the VS application, wherein the first server cluster is associated with a first pool comprising a first load balancing application, and wherein when the first packet is received from a tester, the first server cluster comprises one or more servers operating in a maintenance or tester mode; and
   transmit the first packet to the first pool;
the first load balancing application, stored in the at least one memory, which when executed by the at least one processor, causes the at least one processor to be configured to determine a server in the first server cluster to which the route the first packet at the first time based on a one or more load balancing factors;
wherein at a second time after the first time, the parameter changes in value;
wherein after the second time, the VS application, when executed, further causes the at least one processor to be configured to:
   determine to route a second packet to a second server cluster after the second time in response to applying the parameter to the rule, wherein the second server cluster is associated with a second pool comprising a second load balancing application; and
   transmit the second packet to the second pool; and
a second load balancing application, stored in the at least one memory, which when executed by the at least one processor, causes the at least one processor to be configured to determine a server in the second server cluster to which the route the second packet based on the one or more load balancing factors.

2. The communication system of claim 1, wherein when the parameter is a first value, the rule indicates that the first packet is to be routed to a default server cluster.

3. The communication system of claim 1, wherein when the parameter is a second value, the rule indicates that the first packet is to be routed to a switched server cluster.

4. The communication system of claim 1, wherein when the first packet is received from a client, the first server cluster comprises one or more servers operating in an active mode.

5. The communication system of claim 1, wherein the parameter is a single alphanumeric value that changes over time.

6. The communication system of claim 1, wherein the VS application is further configured to:

receive the first packet from a first source; and determine a type of the first source based on data carried in the first packet, wherein the determination to route the first packet to the first server cluster at the first time is in response to applying the parameter and the type of the first source to the rule programmed at the VS application.

7. The communication system of claim 6, wherein the data carried in the first packet comprises at least one of an identifier of the first source as carried in a header of the first packet or content of the first packet.

8. The communication system of claim 6, wherein the first source is a client.

9. The communication system of claim 8, wherein the first server cluster comprises one or more servers operating in an active mode.

10. The communication system of claim 6, wherein the VS application is further configured to:

receive the second packet from a second source; and determine a type of the second source based on data carried in the second packet, wherein the determination to route the second packet to the second server cluster after the second time is in response to applying the parameter and the type of the second source to the rule programmed at the VS application.

11. The communication system of claim 10, wherein the first source and the second source are different.

12. The communication system of claim 10, wherein the data carried in the second packet comprises at least one of an identifier of the second source as carried in a header of the second packet or content of the second packet.

13. The communication system of claim 10, wherein the second source is a tester.

14. The communication system of claim 13, wherein the second server cluster comprises one or more servers operating in a maintenance of standby mode.

15. The communication system of claim 1, wherein the VS application is further configured to obtain the parameter from the at least one data store at the first time.

16. The communication system of claim 1, wherein the VS application is further configured to obtain the parameter from the at least one data store after the second time.

17. The communication system of claim 1, wherein the parameter is a single alphanumeric value that, when provided as input to the rule programmed at the VS application, indicates a respective pool or load balancing application associated with a server cluster toward which to forward traffic.

18. The communication system of claim 1, wherein the parameter changes in value based on changes in status of one or more servers in the first server cluster or the second server cluster, and wherein the one or more servers change status when a server of the one or more servers goes in or out of maintenance mode, standby mode, or active mode.

19. The communication system of claim 1, wherein the determination to route the first packet to the first server cluster at the first time is in response to applying the parameter and other data to the rule programmed at the VS application, wherein the other data comprises one or more of an identification of a source of the first packet or an identification of a destination of the first packet.

20. The communication system of claim 1, wherein the determination to route the second packet to the second server cluster after the second time is in response to applying the parameter and other data to the rule programmed at the VS application, wherein the other data comprises one or more of an identification of a source of the second packet or an identification of a destination of the second packet.

* * * * *